United States Patent
Zhu et al.

(10) Patent No.: US 8,737,070 B2
(45) Date of Patent: May 27, 2014

(54) HEAT DISSIPATION SYSTEM

(75) Inventors: Chao-Jun Zhu, Shenzhen (CN);
Xiang-Kun Zeng, Shenzhen (CN);
Zhi-Jiang Yao, Shenzhen (CN); Li-Fu Xu, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 322 days.

(21) Appl. No.: 13/195,004

(22) Filed: Aug. 1, 2011

(65) Prior Publication Data

US 2012/0222841 A1 Sep. 6, 2012

(30) Foreign Application Priority Data

Mar. 3, 2011 (CN) .......................... 2011 1 0051330

(51) Int. Cl.
*H05K 7/20* (2006.01)

(52) U.S. Cl.
USPC ................. 361/697; 361/679.47; 361/679.48; 361/679.49; 361/710; 165/80.3; 174/16.3; 174/548

(58) Field of Classification Search
USPC ........ 361/679.46–679.54, 688–710, 717–722
See application file for complete search history.

(56) References Cited

U.S. PATENT DOCUMENTS

| | | | | |
|---|---|---|---|---|
| 5,828,549 A * | 10/1998 | Gandre et al. | ................ | 361/695 |
| 6,031,720 A * | 2/2000 | Crane et al. | ................... | 361/695 |
| 6,935,419 B2 * | 8/2005 | Malone et al. | ................ | 165/185 |
| 7,545,645 B2 * | 6/2009 | Kuan | ............................ | 361/700 |
| 7,573,713 B2 * | 8/2009 | Hoffman et al. | .............. | 361/697 |
| 8,081,465 B2 * | 12/2011 | Nishiura | ....................... | 361/703 |
| 2002/0134531 A1 * | 9/2002 | Yanagida | ..................... | 165/80.3 |
| 2005/0259392 A1 * | 11/2005 | Vinson et al. | ................. | 361/687 |
| 2012/0181000 A1 * | 7/2012 | Zhu et al. | ...................... | 165/121 |

* cited by examiner

*Primary Examiner* — Courtney Smith
(74) *Attorney, Agent, or Firm* — Novak Druce Connolly Bove + Quigg LLP

(57) ABSTRACT

A heat dissipation system includes an enclosure, a first heat sink, a second heat sink, and a fan. The enclosure includes a bottom plate, a first side plate, and a second side plate. A first air vent area is located on the first side plate. A second air vent area is located on the second side plate. A first heat generation apparatus and a second heat generation apparatus is mounted on the bottom plate and located between the first air vent area and the second air vent area. A first heat sink is mounted on the bottom plate and contacts the first heat generation apparatus. A second heat sink is mounted on the bottom plate and contacts the second heat generation apparatus. A plurality of second fins is located on the second heat sink. Each second fin is wavy. A fan is located between the first air vent area and the second air vent area. The fan is adapted to drive air to flow through the first air vent area, the first heat sink, the plurality of second fins, and the second air vent area.

17 Claims, 4 Drawing Sheets

HEAT DISSIPATION SYSTEM

BACKGROUND

1. Technical Field

The present disclosure relates to heat dissipation systems, and particularly relates to a heat dissipation system for removing heat from an electronic device.

2. Description of Related Art

With developments in computing technology, electronic components in the computers, such as central processing units (CPUs), are running more quickly. However, the CPUs usually generate excessive heat during operation, which can deteriorate operational stability and damage associated elements. The heat must be removed quickly. A commonly used heat dissipation component includes a heat sink mounted on a CPU. The heat sink may include a plurality of parallel fins and several heat pipes passing therethrough. A fan is mounted on the fins to dissipate heat from the fins. However, because there is a plurality of components mounted in an inner space of the computer, air flowing in the inner space of the computer is often not smooth and that tampers heat dissipation of the computer.

Therefore, there is room for improvement within the art.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
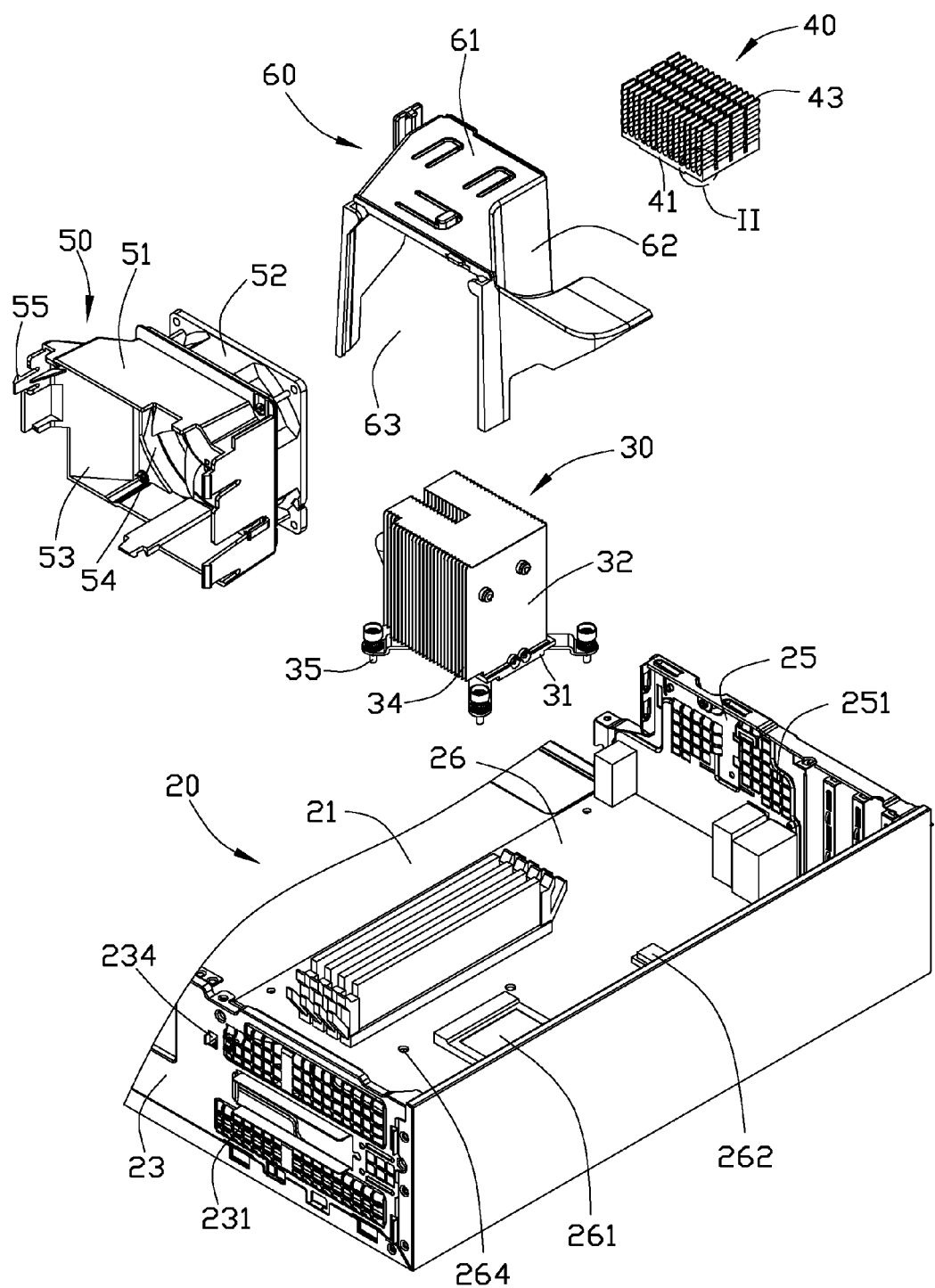
FIG. 1 is an isometric and exploded view of an exemplary embodiment of a heat dissipation system.

Referring to FIG. 1, a heat dissipation system in accordance with an exemplary embodiment includes an enclosure 20, a first heat sink 30, a second heat sink 40, a first air ducting apparatus 50, and a second air ducting apparatus 60.

The enclosure 20 includes a bottom plate 21, a first side plate 23, a second side plate 25. The first side plate 23 and the second side plate 25 are perpendicularly connected to opposite edges of the bottom plate 21. The first side plate 23 defines a first air vent area 231. The second side plate 25 defines a second air vent area 251 in alignment with the first air vent area 231. The first side plate 23 further defines a plurality of engaging holes 234 adjacent the first air vent area 231.

A motherboard 26 is mounted on the bottom plate 21. The motherboard 26 is located between the first side plate 23 and the second side plate 25. The motherboard 26 includes a first heat generation apparatus 261 and a second heat generation apparatus 262. The first heat generation apparatus 261 and the second heat generation apparatus 262 are located between the first air vent area 231 and the second air vent area 251. The first heat generation apparatus 261 is adjacent to the first air vent area 231. The second heat generation apparatus 262 is adjacent to the second air vent area 251. Four mounting holes 264 are placed adjacent to four corners of the first heat generation apparatus 261. In one embodiment, the first heat generation apparatus 261 is a CPU, and the second heat generation apparatus 262 is a north bridge chipset.

The first air ducting apparatus 50 includes an air duct cover 51 and a fan 52. The air duct cover 51 includes an air inlet opening 53 and an air outlet opening 54. An area of the air inlet opening 53 is larger than that of the air outlet opening 54. The air duct cover 51 includes a plurality of clasps 55 adjacent to the air inlet opening 53. The fan 52 is mounted on the air duct cover 51 and in alignment with the air outlet opening 54.

The second air ducting apparatus 60 includes a top wall 61 and a pair of side walls 62 connected to opposite edges of the top wall 61. An air channel 63 is surrounded by the top wall 61 and the pair of side walls 62.

The first heat sink 30 includes a first base 31. A plurality of parallel first fins 32 is located on a top side of the first base 31. Each first fin 32 can be a plane plate. A first air path 34 is formed between two adjacent first fins 32. Four screws 35 are mounted on four corners of the first base 31.

Figure 2:
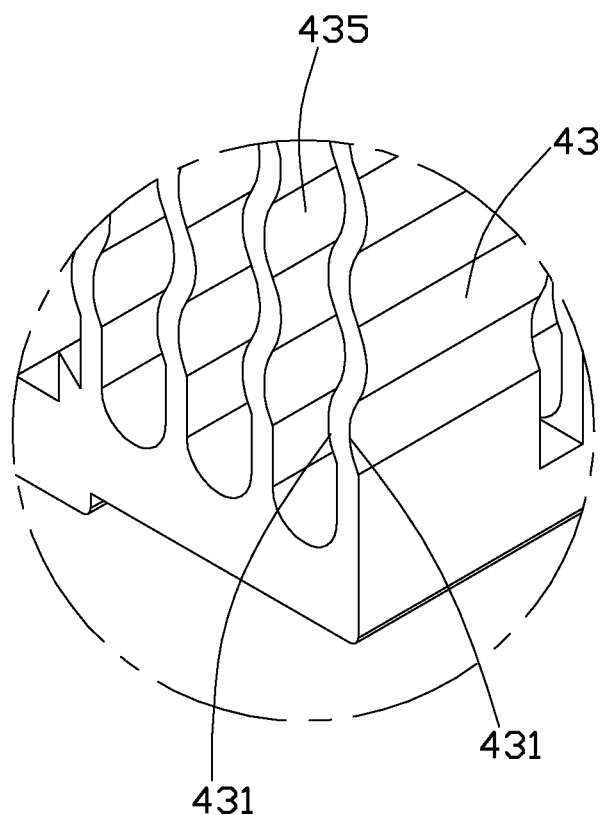
FIG. 2 is an enlarged view of the circled portion II of FIG. 1.
Figure 3:
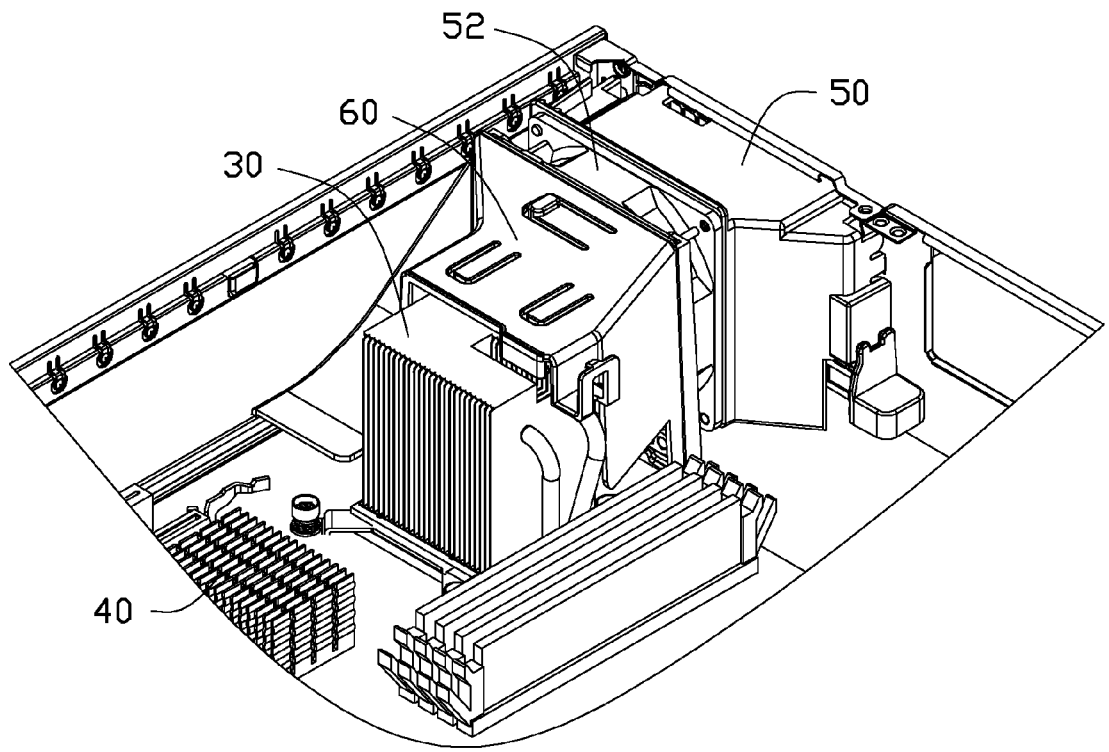
FIG. 3 is an isometric and assembled view of the heat dissipation system of FIG. 1.
Figure 4:
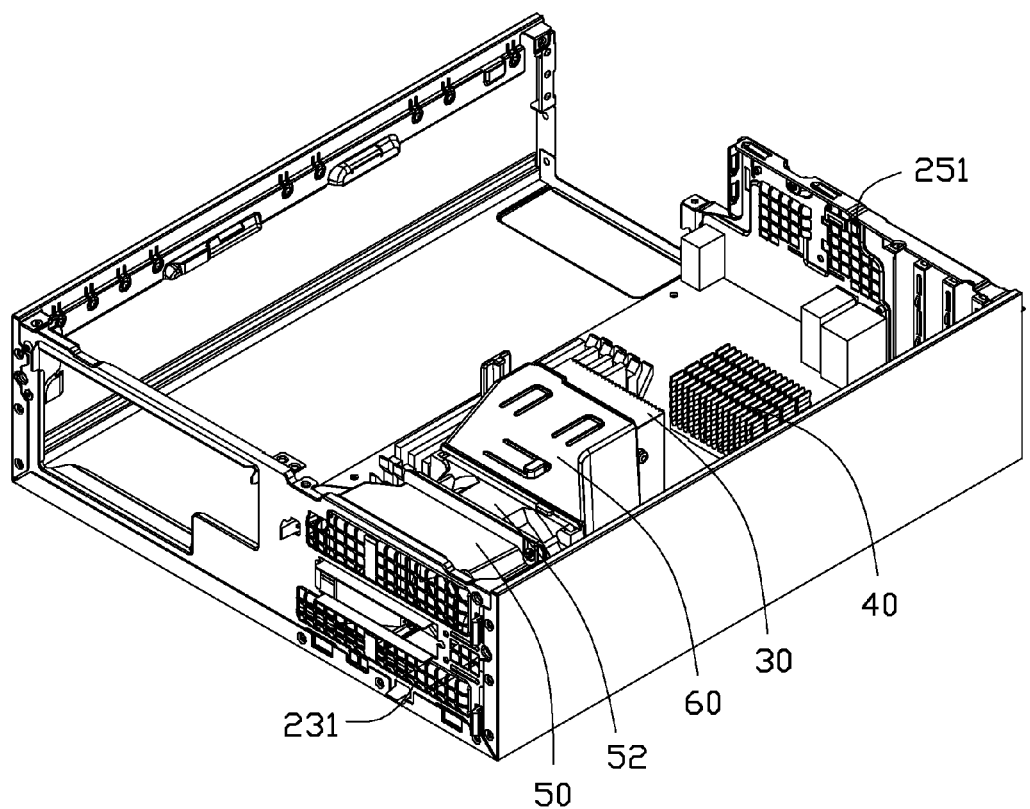
FIG. 4 is another isometric and assembled view of the heat dissipation system of FIG. 1.

Referring to FIGS. 1 and 2, the second heat sink 40 includes a second base 41. A plurality of parallel second fins 43 is located on a top side of the second base 41. Each second fin 43 is wavy. Each second fin 43 includes a pair of wavy side faces 431. The wavy side face 431 has larger area than flat side face, so the second fin 43 has a larger area than that of conventional plane fin of conventional heat sink. A wavy air path 435 is formed between two adjacent wavy side faces 431 of two adjacent second fins 43.

Referring to FIGS. 1 to 4, in assembly of the heat dissipation system, the screws 35 of the first heat sink 30 is mounted in the mounting holes 264 to secure the first heat sink 30 on the motherboard 26. A bottom side of the first base 31 contacts the first heat generation apparatus 261. Heat generated by the first heat generation apparatus 261 is transmitted to the first fins 32 of the first heat sink 30. Then, the second heat sink 40 is secured on the motherboard 26. A bottom surface of the second base 41 contacts the second heat generation apparatus 262. Heat generated by the second heat generation apparatus 262 is transmitted to the second fins 42 of the second heat sink 40.

In succession, the air inlet opening 53 of the first air ducting apparatus 50 is aligned to the first air vent area 231 of the enclosure 20. The clasps 55 of the first air ducting apparatus 50 are engaged in the engaging holes 234 of the enclosure 20 to mount the first air ducting apparatus 50 on the enclosure 20. Then, the second air ducting apparatus 60 is mounted on the first heat sink 60. The first fins 32 of the first heat sink 30 are located in the air channel 63. At this position, the fan 52 is aligned to the air channel 63. The first air vent area 231, the air inlet opening 53, the air outlet opening 54, the fan 52, the air channel 63, the first air paths 34, and the wavy air paths 435 are aligned in a straight line.

In use, the fan 52 rotates to drive the air to flow through first air vent area 231, the air inlet opening 53, the air outlet opening 54, the fan 52, the air channel 63, and the first air paths 34 to bring heat away from the first fins 32, and flows through the wavy air paths 435 to drive heat away from the second fins 42. At last, air flows out of the enclosure 20 via the second air vent area 251.

In the heat dissipation system, air can flow through the first heat sink 30 and the second heat sink 40 smoothly. Therefore, heat on the first heat sink 30 and the second heat sink 40 can be dissipated quickly.

It is to be understood, however, that even though numerous characteristics and advantages of the embodiments have been set forth in the foregoing description, together with details of the structure and functions of the embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A heat dissipation system, comprising:
   an enclosure comprising a bottom plate, a first side plate, and a second side plate, a first air vent area located on the first side plate, a second air vent area located on the second side plate, a first heat generation apparatus and a second heat generation apparatus mounted on the bottom plate and located between the first air vent area and the second air vent area;
   a first heat sink mounted on the bottom plate and contacted the first heat generation apparatus;
   a second heat sink mounted on the bottom plate and contacted the second heat generation apparatus, a plurality of second fins located on the second heat sink, each of the plurality of second fins being wavy and comprising a pair of wavy side faces; and
   a fan located between the first air vent area and the second air vent area, wherein the fan drives air in turn flowing through the first air vent area, the first heat sink, the plurality of second fins, and the second air vent area.

2. The heat dissipation system of claim 1, wherein a wavy air path is formed between two adjacent wavy side faces of two adjacent second fins, and air flows through the wavy air path.

3. The heat dissipation system of claim 1, further comprising a first air ducting apparatus, wherein the first air ducting apparatus comprises an air inlet opening and an air outlet opening, the air inlet opening is in alignment with the first air vent area, and the and the air outlet opening is in alignment with the fan.

4. The heat dissipation system of claim 3, wherein the first air ducting apparatus comprises a plurality of clasps adjacent the air inlet opening, the first side plate defines a plurality of engaging holes adjacent the first air vent area, and the plurality of clasps are engaged in the plurality of engaging holes.

5. The heat dissipation system of claim 3, wherein an area of the air inlet opening is larger than that of the air outlet opening.

6. The heat dissipation system of claim 1, further comprising a second air ducting apparatus, wherein the second air ducting comprises an air channel, the second air ducting apparatus is mounted on the first heat sink, the first heat sink is located in the air channel, and the fan is aligned to the air channel.

7. A heat dissipation system, comprising:
   an enclosure comprising a bottom plate, a first heat generation apparatus and a second heat generation apparatus mounted on the bottom plate;
   a first heat sink mounted on the bottom plate and contacted the first heat generation apparatus;
   a second heat sink mounted on the bottom plate and contacted the second heat generation apparatus, a plurality of wavy air paths located on the second heat sink; and
   a fan located in alignment with the first heat sink and the second heat sink, the fan being located between the first heat sink and the second heat sink, wherein the fan drives air flowing through the first heat sink and the plurality of wavy air paths of the second heat sink.

8. The heat dissipation system of claim 7, wherein the enclosure further comprises a first side plate and a second side plate connected to opposite edges of the bottom plate, a first air vent area is located on the first side plate, a second air vent area is located on the second side plate, the first air vent area, the second air vent area, the first heat sink, and the plurality of wavy air paths are aligned in a straight line.

9. The heat dissipation system of claim 8, wherein the first heat generation apparatus and the second heat generation apparatus are located between the first air vent area and the second air vent area.

10. The heat dissipation system of claim 8, wherein the fan is located between the first air vent area and the second air vent area, the fan is adapted to drive air flowing in the enclosure through the first air vent area and flowing out of the enclosure through the second air vent area.

11. The heat dissipation system of claim 10, further comprising a first air ducting apparatus, wherein the first air ducting apparatus comprises an air inlet opening and an air outlet opening, the air inlet opening is in alignment with the first air vent area, and the and the air outlet opening is in alignment with the fan.

12. The heat dissipation system of claim 11, wherein the first air ducting apparatus comprises a plurality of clasps adjacent the air inlet opening, the first side plate defines a plurality of engaging holes adjacent the first air vent area, and the plurality of clasps are engaged in the plurality of engaging holes.

13. The heat dissipation system of claim 11, wherein an area of the air inlet opening is larger than that of the air outlet opening.

14. The heat dissipation system of claim 11, further comprising a second air ducting apparatus, wherein the second air ducting comprises an air channel, the second air ducting apparatus is mounted on the first heat sink, the first heat sink is located in the air channel, and the fan is aligned to the air channel.

15. The heat dissipation system of claim 7, wherein the second heat sink comprises a plurality of second fins located on the second heat sink, each of the plurality of second fins being wavy and comprising a pair of wavy side faces.

16. The heat dissipation system of claim 15, wherein the plurality of wavy air paths are defined between the plurality of second fins.

17. A heat dissipation system, comprising:
   an enclosure comprising a bottom plate, a first heat generation apparatus and a second heat generation apparatus mounted on the bottom plate;
   a first heat sink mounted on the bottom plate and in contact with the first heat generation apparatus;
   a second heat sink mounted on the bottom plate and in contact with the second heat generation apparatus, a plurality of wavy air paths being defined on the second heat sink; and
   a fan located in alignment with the first heat sink and the second heat sink, the fan being configured to drive air flowing through the first heat sink and the plurality of wavy air paths of the second heat sink; and
   a first air ducting apparatus, wherein the first air ducting apparatus comprises an air inlet opening and an air outlet opening, the air inlet opening is in alignment with the first air vent area, and the and the air outlet opening is in alignment with the fan.

* * * * *